UNITED STATES PATENT OFFICE.

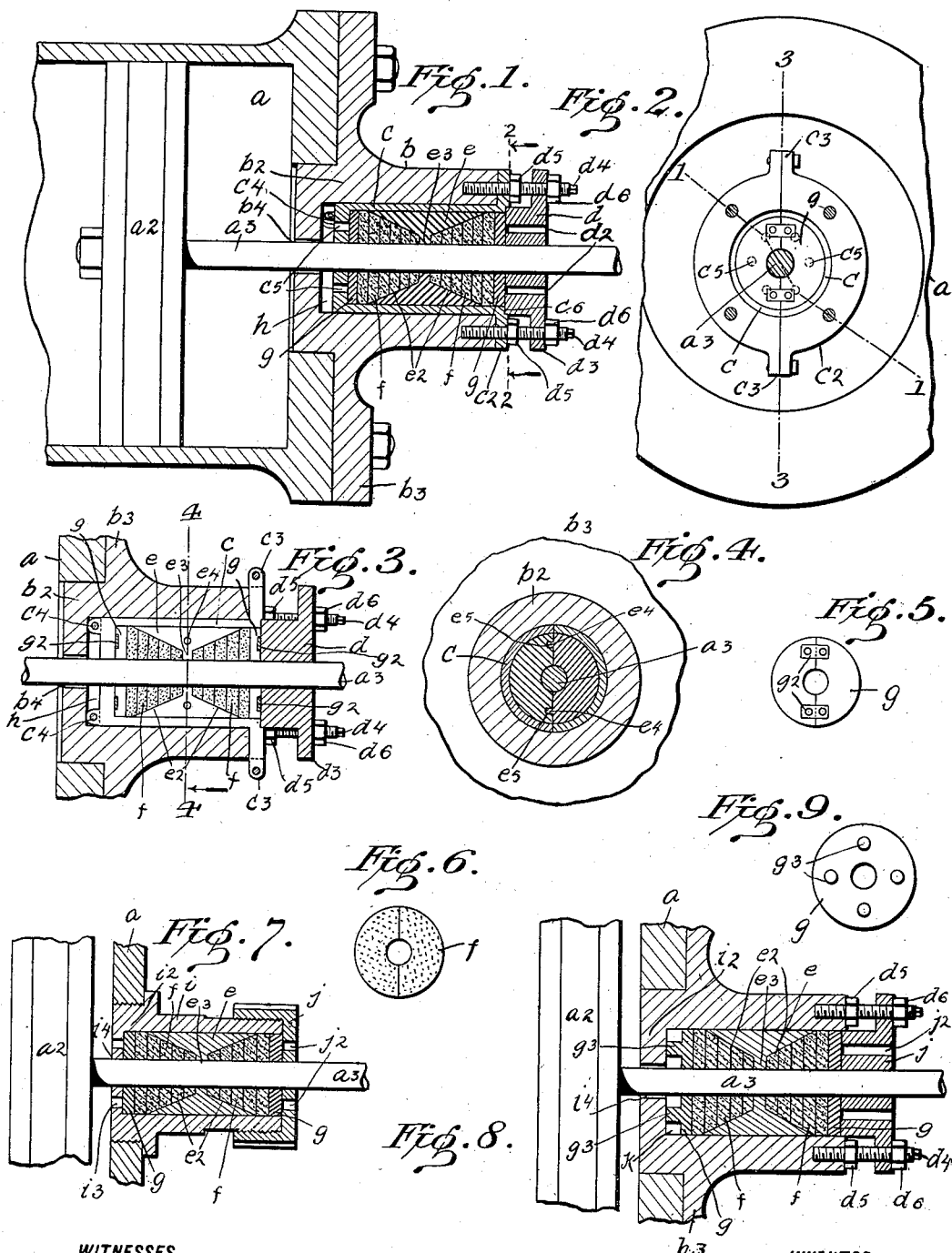

CHARLES P. McMULLEN, OF BROOKLYN, NEW YORK.

PACKING-BOX.

No. 859,329.  Specification of Letters Patent.  Patented July 9, 1907.

Application filed March 15, 1907. Serial No. 362,444.

*To all whom it may concern:*

Be it known that I, CHARLES P. McMULLEN, a citizen of the United States, and residing at Brooklyn, in the county of Kings and State of New York, have invented certain new and useful Improvements in Packing-Boxes, of which the following is a specification, such as will enable those skilled in the art to which it appertains to make and use the same.

This invention relates to packing boxes for piston rods, valve rods and like devices, and the object thereof is to provide an improved device of this class which is adapted for use in connection with piston rods, and valve rods or stems whether the same be longitudinally movable or rotatable in operation, and which may also be applied to either hydraulic or steam cylinders, steam throttle valves, turbine apparatus or other apparatus employing water, steam, gas or air; a further object being to provide a packing box which is so constructed that it may be applied to the cylinder of a steam operated pump, or to the cylinder, valve casing or any corresponding part of a steam, hydraulic, air pressure or similar apparatus or machine without disconnecting or dismantling the parts of the machine or engine, whereby a new packing box or packing may be applied to an apparatus of the class specified, or a new packing box substituted for an old one whenever desired, at a minimum of expense and with the least possible loss of time; a further object being to provide a packing box of the class described which contains a compressible packing movable longitudinally in the chamber of the packing box and operated upon in one direction by pressure in the cylinder, valve casing, or other device or apparatus to which the packing box is applied and which may be operated upon in the opposite direction by air under atmospheric pressure whereby a perfectly secure and tight packing is produced with a minimum of expense; and with these and other objects in view the invention consists in a device of the class specified constructed as hereinafter described.

The invention is fully disclosed in the following specification, of which the accompanying drawing forms a part, in which the separate parts of my improvement are designated by suitable reference characters in each of the views, and in which;

Figure 1 is a sectional side view of one end of a hydraulic or steam cylinder provided with one form of my improved packing box, the section of the packing box being taken on the line 1—1 of Fig. 2; Fig. 2 a section on the line 2—2 of Fig. 1; Fig. 3 a section on the line 3—3 of Fig. 2; Fig. 4 a section on the line 4—4 of Fig. 3; Fig. 5 a side view of a "floating" or movable packing ring which I employ; Fig. 6 a side view of a fibrous packing ring which I employ; Fig. 7 a view similar to Fig. 1 but showing another form of construction; Fig. 8 a view similar to Fig. 7 but showing a modification thereof; and, Fig. 9 a side view of a "floating" packing disk employed in the construction shown in Fig. 8.

In the drawing forming part of this specification, reference being made to the construction shown in Figs. 1 to 6 inclusive, I have shown at $a$ one end of a cylinder which may be either a hydraulic cylinder, a steam cylinder, or an air or gas cylinder, and in which is placed a piston $a^2$ provided with a rod $a^3$, and in the practice of my invention, I provide a packing box $b$ which is of the following construction. The base member or casing $b^2$ of the packing box is of the usual form and is provided with an annular flange $b^3$ by which it is secured to the head of the cylinder $a$ in the usual manner and the central opening $b^4$ in the bottom of the base member $b^2$ of the packing box is larger in diameter than the piston rod $a^3$.

Within the base member or casing $b^2$ of the packing box is placed a supplemental casing $c$ having a flange or rim $c^2$ and divided longitudinally into two separate similar parts as clearly shown in Figs. 2, 3 and 4, and the separate parts of the flange or rim $c^2$ are provided with laterally directed lugs or projections $c^3$ by which said parts are secured together, and the inner end portion of the separate parts of the casing $c$ are also provided with longitudinally directed lugs or projections $c^4$ through which are passed bolts which also serve to secure the separate parts of said casing $c$ together, and the inner end of said casing $c$ is provided with longitudinally arranged ports or passages $c^4$, shown in full lines in Fig. 1 and indicated in dotted lines in Fig. 2.

The packing box $b$ also involves the usual gland member $d$ and the outer end of the casing $c$ is provided with an annular groove $c^6$ in which the inner end of the gland member $d$ fits, and said gland member is preferably provided with longitudinally arranged ports or passages $d^2$ which form a communication between the casing $c$ and the atmospheric air, and the gland member $d$ is provided with an annular flange $d^3$ through which are passed bolts or screws $d^4$ provided with nuts $d^5$ and $d^6$ by means of which the casing $c$ is secured to the base member $b^2$ of the packing box, and the gland member $d$ to the casing $c$.

Within the casing $c$ is placed a longitudinally movable sleeve $e$ which is shorter than the casing $c$, and the inner end portions thereof are beveled out or cut out to form conical packing chambers $e^2$ in the casing $c$ which are separated by an inwardly directed central annular rib $e^3$ in the sleeve $e$ and in which are placed fibrous packing rings or disks $f$ which are saturated with paraffin or other preservative material whereby they are preserved against the operation of liquids or gases of any kind or class, and one of which is shown in Fig. 6. The sleeve $e$ being shorter than the casing $c$, the outer end portions of the packing members $e^2$ are cylindrical in form and placed therein are "floating" or movable metal packing disks $g$ one of which is shown in Fig. 5.

The sleeve $e$, the movable metal packing disks $g$, and the packing rings or disks $f$ are all composed of separate parts, as shown, and in practice the adjacent faces of the separate parts of the sleeve $e$ are provided, one with dowel pins $e^4$ and the other with sockets $e^5$ to receive said dowel pins, whereby said parts of said sleeve are connected and the separate parts of the "floating" or movable metal packing disks $g$ are connected by counter-sunk cross plates $g^2$ as shown Figs. 3 and 5.

It will be observed that the holes or apertures in the flange or rim $c^2$ of the casing $c$ and the flange or rim $d^3$ of the gland $d$ through which the bolts or screws $d^4$ are passed are larger than said bolts or screws, and the method of assembling the parts of the packing box shown in Figs. 1 to 4 inclusive is as follows. The chief object of this form of construction is to provide a packing which may be applied to the cylinders of hydraulic, steam or similar apparatus, or to throttle valve casings or similar devices, without dismantling or disconnecting the parts of the apparatus or machine, and it will be understood that in such cases the apparatus or machine has already been provided with a packing box involving the base member $b$ and gland member $d$, and in this case all that is necessary is to loosen the gland $d$ and move it longitudinally on the piston rod $a^3$, take out the packing originally placed in the base member $b^2$ of the packing box, assemble the parts of the supplemental casing $c$ on the rod $a^3$ and secure them together, place the parts of the inner "floating" or movable packing disk $g$ on the rod $a^3$ and secure them together and insert said disk into the supplemental casing $c$, assemble the separate parts of the packing disks or rings $f$ in the inner conical packing chamber $e^2$ on the rod $a^3$ and insert them into the casing $c$, assemble the separate parts of the sleeve $e$ and insert said sleeve into said casing $c$, assemble the separate packing disks or rings $f$ in the outer conical chamber $e^2$ on the rod $a^3$ and insert them into said chamber, connect the separate parts of the outer "floating" or movable packing disk $g$ on the rod $a^3$ and secure them together and insert said disk into the casing $c$, slide said casing $c$ into the base member $b^2$ of the packing box, in which operation the screws $d^4$ secured in the base member $b^2$ of the packing box pass through the corresponding openings in the flange or rim $c^2$ of the casing $c$, screw down the nuts $d^5$ onto said flange or rim and then slide the gland $d$ onto the bolts $d^4$ and screw on the nuts $d^6$ onto said bolts.

In placing the fibrous packing rings or disks $f$ in position, as above described, they are so arranged that the separate parts thereof will break joints, and when the separate parts of the packing have been assembled and secured in the base member $b^2$ of the packing box $b$, the lugs $c^4$ at the inner end of the casing $c$ prevent said end of said casing from striking the bottom of the base member $b^2$ of the packing box, and this forms a chamber $h$ in the bottom of the base member $b^2$ of the packing box which chamber is in communication with the interior of the cylinder $a$ through the central opening $b^4$ through which the rod $a^3$ of the piston passes, and in the outward movement of the piston $a^2$ the steam, gas, air, water or other material in said piston passes into the chamber $h$ and through the ports or passages $c^5$ in the inner end of the casing $c$ and operating on the "floating" packing disk $g$ forces the entire packing in the casing $c$ outwardly or toward the outer end of said casing, and in this operation the fibrous packing disks or rings $f$ are compressed on the rod $a^3$ and in connection with the sleeve $e$ and a perfectly tight packing is thus produced. When the piston $a^2$ moves inwardly, in the cylinder $a$, the elastic quality of the packing disks or rings $f$ force the "floating" packing disk $g$ back into the position shown in Fig. 1, and this operation is aided by atmospheric air passing through the ports or passages $d^2$ in the gland $d$, if said ports or passages are employed. The employment of the ports or passages in the gland $d$ is not, however, absolutely essential, and, if said ports or passages are employed in repairing an old packing box, as hereinbefore described, they must be bored in said gland while the same is on the rod $a^3$, or else it would be necessary to dismantle the pump or other apparatus so as to take the gland off of said rod. It will be observed, that the entire packing in the casing $c$ including the sleeve $e$, the fibrous disks or rings $f$, and the "floating" metal disks $g$ are movable longitudinally in said casing, and by reason of this construction the movement and compression of the fibrous packing rings or disks $f$ by pressure thereon from the cylinder $a$ is facilitated as is also the expansion of the said packing rings or disks $f$ when the piston $a^2$ moves backwardly in the cylinder $a$.

In Fig. 7, I have shown my improvement applied to an ordinary packing box made in the usual manner, and in this figure the part $a$ represents the head of a cylinder in which is placed the piston $a^2$ having the rod $a^2$. In this case the packing box as a whole is designated by the reference character $i$ and the main or base member $i^2$ thereof, is provided in the bottom thereof, with ports or passages $i^3$ which communicate directly with the interior of the cylinder and the gland $j$ is screwed directly onto the base member $i^2$ of the packing box, or may be connected therewith in any desired manner, and said gland is also provided with ports or passages $j^2$ which form a communication between the interior of the part $i^2$ of the packing box and the atmospheric air. In this case the packing sleeve $e$, fibrous packing rings or parts $f$ and metal "floating" packing disks $g$ are also employed, the said sleeve, the fibrous packing members $f$ and the "floating" metal packing disk $g$ are formed integrally, or in other words are not formed of separate parts adapted to be connected when assembled on the rod $a^3$. In this form of construction, the rod $a^3$ may fit snugly in the aperture $i^4$ in the base or part $i^2$ of the packing box through which said rod $a^3$ passes, and the pressure from the cylinder which operates on the corresponding "floating" packing disk $g$ passes directly through the ports or passages $i^3$ and the packing in the packing box is compressed in the same manner, as hereinbefore described, with reference to the construction shown in Figs. 1 to 4. In this form of construction, the ports or passages $j^2$ in the gland $j$ may be omitted, if desired, but I prefer to employ the same as the atmospheric pressure operating through said ports or passages would aid in moving the packing backwardly or in the direction of the cylinder when the piston $a^2$ moves away from the packing box.

The construction shown in Fig. 9 is exactly the same as that shown in Fig. 7, except that the gland $j$ is connected with the base member $i^2$ of the packing box $i$ in the same manner as in the construction shown in Figs. 1 and 3. In this case, however, the inner "floating" packing disk $g$ is provided on the cylinder side thereof with lugs or projections $g^3$ which prevent the said disk from striking the bottom of the base member $i^2$ of the packing box, and this forms a chamber $k$ between said disk and the bottom of the base member $i^2$ of the packing box and the aperture $i^4$ through which the rod $a^3$ of the piston $a^2$ passes is made larger than said rod and the steam, water, gas or other substance in the cylinder passes through the aperture $i^4$ into the chamber $k$ and compresses the packing in the packing box in the same manner as in the construction shown in Figs. 1 and 2, and in Fig. 7. This form of construction, namely, that shown in Figs. 8 and 9 enables me to apply my improved packing to an old style of packing box without boring the ports or passages $i^3$ as shown in Fig. 7, but in applying the form of packing box shown in Fig. 7, or in making a packing box of this style the ports or passages $i^3$ are bored before the packing box is connected with the cylinder.

With the construction shown in Figs. 8 and 9, my improved packing may be applied to an old box already in use by dismantling the pump or other apparatus without boring the ports or passages $i^3$ shown in Fig. 7, and this is a great advantage, under certain circumstances, as the ports or passages $i^3$ cannot be bored without leaving clippings or drillings in the cylinder which would have to be removed therefrom before the apparatus could be used.

In all the forms of construction, it will be seen that the actual packing employed, namely, the sleeve $e$, the fibrous packing disks, rings or members $f$ and the "floating" packing disks $g$ are employed and this packing is adapted to be compressed by pressure from the cylinder operating through the ports or passages $i^3$ in Fig. 7, or through the aperture $b^4$ in Figs. 1 and 3, or through the aperture $i^4$ in Fig. 8.

In this way, I provide a packing box, the packing in which is compressed at each stroke of the piston in the direction of the packing box and released or expanded during the opposite movement of said piston, and in this operation the packing is moved longitudinally of the packing box and the fact that the packing members $f$ are made of fibrous material facilitates this operation and renders the same very effective and practical.

My invention, however, is not limited to the use of disks or rings $f$ of packing material as the packing chambers in the packing box formed by the sleeve $e$ and the base member of said packing box may be filled in with fibrous cords wound around the rod $a^3$ or fibrous packing material may be secured or placed in said chambers in any desired manner, and although, I have shown my improvement applied to a cylinder adapted to contain steam, water, gas or air, and provided with a piston having a rod passing through the packing box, it will be apparent that my said improvement may be applied to packing boxes for valve stems applied to valve casings or to the corresponding parts of turbine apparatus or similar apparatus of any kind or class.

By making the packing $f$ of fibrous material and saturating it with paraffin, or similar preservative substance, the said material is not only preserved but is given a quality which renders it elastic and expansive when compressed and prevents the same from becoming solidified or hardened, and this constitutes one of the chief features of my invention when taken in connection with the sleeve $e$ by which separate packing chambers are formed in each end of the base member of the packing box.

Having fully described my invention, what I claim as new and desire to secure by Letters Patent, is:—

1. A packing box for piston rods, valve rods and the like adapted to be connected with a cylinder, valve casing or the like, said packing box comprising a base member and a gland, and a sleeve which is placed in and is shorter than said main chamber and the ends of which are beveled out to form in connection with the walls of the main chamber two conical packing chambers, and fibrous packing material placed in said conical packing chambers, said fibrous packing material being saturated with paraffin or other preservative substance, and said sleeve and said fibrous packing material being movable longitudinally of the main packing chamber, and said sleeve and said fibrous packing material being adapted to be moved in one direction and the fibrous packing material compressed by pressure applied in one end of the main packing chamber from the cylinder or valve casing.

2. A packing box for piston rods, valve rods and the like adapted to be connected with a cylinder, valve casing or the like, said packing box comprising a base member and a gland, and a sleeve which is placed in and is shorter than said main chamber and the ends of which are beveled out to form in connection with the walls of the main chamber two conical packing chambers, and fibrous packing material placed in said conical packing chambers, said fibrous packing material being saturated with paraffin or other preservative substance, and said sleeve and said fibrous packing material being movable longitudinally of the main packing chamber, and said sleeve and said fibrous packing material being adapted to be moved in one direction and the fibrous packing material compressed by pressure applied in one end of the main packing chamber from the cylinder or valve casing, the opposite end of the main packing chamber being in communication with the atmospheric air through ports or passages in the gland of the packing box.

3. A packing box for piston rods, valve rods and the like adapted to be connected with a cylinder, valve casing or the like, said box being provided with a main chamber, a longitudinally movable sleeve which is placed in and is shorter than said main chamber and the ends of which are beveled out to form in connection with the walls of said main chamber two conical packing chambers, the base of one of which is directed toward the cylinder, valve casing or the like and the base of the other toward the gland of the packing box, fibrous packing material placed in said conical packing chambers, said packing material being saturated with paraffin or other preservative substance, and movable disks placed in the base or larger end portions of said conical packing chambers, said sleeve, said disks and said packing material being movable longitudinally of the main packing chamber and said parts being adapted to be moved in one direction and the fibrous packing material compressed by pressure applied thereto from the cylinder or valve casing and operating on the adjacent movable disk.

4. A packing box for piston rods, valve rods and the like adapted to be connected with a cylinder, valve casing or the like, said box being provided with a main chamber, a longitudinally movable sleeve which is placed in and shorter than said main chamber and the ends of which are beveled out to form in connection with the walls of said main chamber two conical packing chambers, the base of one of which is directed toward the cylinder, valve casing or the like and the base of the other toward the gland of the packing box, fibrous packing material placed in said conical packing chambers, said packing material being saturated with paraffin or other preservative substance, and movable disks placed in the base or larger end portions of said conical packing chambers, said sleeve, said disks and said packing material being movable longitudinally of the main packing chamber and said parts being adapted to be moved in one direction and the fibrous packing material compressed by pressure applied thereto from the cylinder or valve casing and operating on the adjacent movable disk through ports or passages formed in the base member of the packing box.

5. A packing box for piston rods, valve rods and the like adapted to be connected with a cylinder, valve casing or the like, said box being provided with a main chamber, a longitudinally movable sleeve, which is placed in and shorter than said main chamber and the ends of which are beveled out to form in connection with the walls of said main chamber two conical packing chambers, the base of one of which is directed toward the cylinder, valve casing or the like and the base of the other toward the gland of the packing box, fibrous packing material placed in said conical packing chambers, said packing material being saturated with paraffin or other preservative substance, and movable disks placed in the base or larger end portions of said conical packing chambers, said sleeve, said disks and said packing material being movable longitudinally of the main packing chamber and said parts being adapted to be moved in one direction and the fibrous packing material compressed by pressure applied thereto from the cylinder or valve casing and operating on the adjacent movable disk through ports or passages formed in the base member of the packing box, the gland of the packing box being also provided with ports or passages forming a communication between the adjacent conical packing chamber and the atmospheric air.

6. A packing box for piston rods, valve rods and the like adapted to be connected with a cylinder, valve casing or the like and composed of a base member, a gland and a casing divided longitudinally into two parts and adapted to fit in the base member and to be held therein by said gland, the inner end of said casing being closed and the outer end thereof open and adapted to be closed by said gland, said casing forming a main packing chamber, and a sleeve divided longitudinally into two parts and which is placed in and is shorter than said main chamber and movable longitudinally thereof and the ends of which are beveled out so as to form in connection with the walls of said casing two conical packing chambers, the base of one of which is in the direction of the cylinder or valve casing and the base of the other in the direction of the gland of the packing box, fibrous packing material placed in said conical packing chambers, said fibrous packing material being saturated with paraffin or other preservative substance, and movable disks placed in the base or larger end portions of said conical packing chambers and composed of separate connected parts, said sleeve, said packing material and said disks being movable longitudinally of said main packing chamber and said parts being adapted to be moved in one direction and the fibrous packing material compressed by pressure applied thereto from the cylinder or valve casing and operating on the adjacent movable disk.

7. A packing box for piston rods, valve rods and the like adapted to be connected with a cylinder, valve casing or the like and composed of a base member, a gland and a casing divided longitudinally into two parts and adapted to fit in the base member and to be held therein by said gland, the inner end of said casing being closed and the outer end thereof open and adapted to be closed by said gland, said casing forming a main packing chamber, and a sleeve divided longitudinally into two parts and which is placed in and is shorter than said main chamber and movable longitudinally thereof and the ends of which are beveled out so as to form in connection with the walls of said casing two conical packing chambers, the base of one of which is in the direction of the cylinder or valve casing and the base of the other in the direction of the gland of the packing box, fibrous packing material placed in said conical packing chambers, said fibrous packing material being saturated with paraffin or other preservative substance, and movable disks placed in the base or larger end portions of said conical packing chambers and composed of separate connected parts, said sleeve, said packing material and said disks being movable longitudinally of said main packing chamber and said parts being adapted to be moved in one direction and the fibrous packing material compressed by pressure applied thereto from the cylinder or valve casing and operating on the adjacent movable disk, the gland of the packing box being also provided with ports or passages forming a communication between the outer conical packing chamber and the atmospheric air.

In testimony that I claim the foregoing as my invention I have signed my name in presence of the subscribing witnesses this 9th day of March 1907.

CHARLES P. McMULLEN.

Witnesses:
C. E. MULREANY,
A. WORDEN GIBBS.